Patented Dec. 14, 1926.

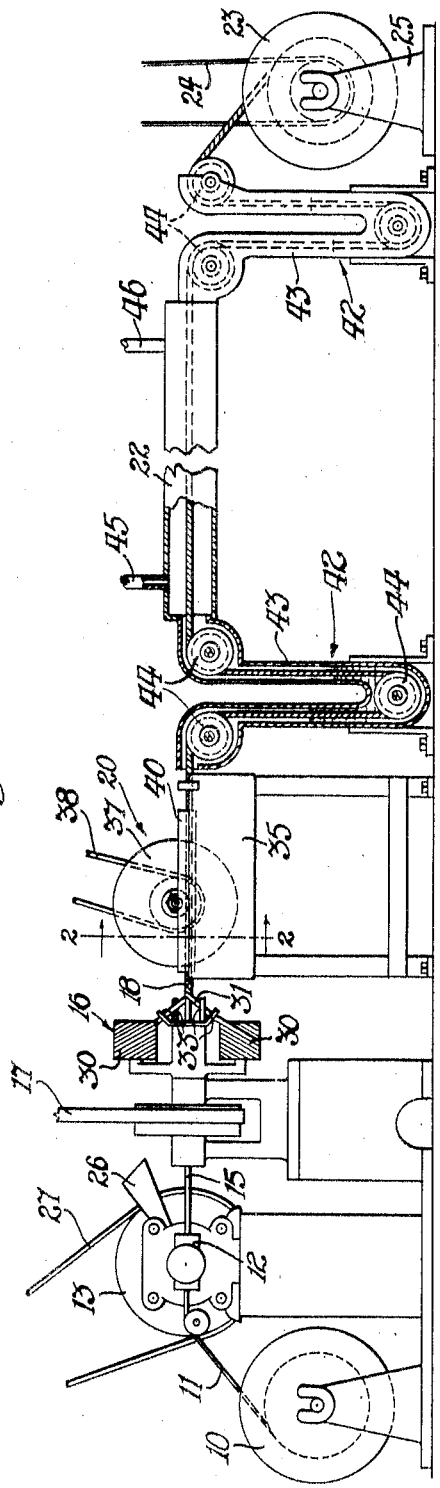

1,610,910

UNITED STATES PATENT OFFICE.

ROBERT R. WILLIAMS, OF ROSELLE, NEW JERSEY, ASSIGNOR TO WESTERN ELECTRIC COMPANY, INCORPORATED, OF NEW YORK, N. Y., A CORPORATION OF NEW YORK.

COMPOSITE ARTICLE AND METHOD OF FORMING IT.

Application filed October 16, 1924, Serial No. 743,914. Renewed October 20, 1926.

This invention relates to a composite article and a method of forming it, and particularly to a composite sheath for a core and a method of forming the sheath.

An object of the invention is to produce a relatively inexpensive composite article for covering cores and the like, by a simplified and improved method.

In accordance with the features of the invention, a portion of material is applied to a portion of vulcanizable material which is treated with an agent which causes it to become tacky so that the portions adhere to each other.

In a specific embodiment of the invention, rubber or a vulcanizable compound thereof is extruded around a traveling electrical conductor or core and contemporaneously therewith a plurality of textile strands are applied to the rubber in helical formation in such manner that each strand contacts with the rubber throughout its entire length. The rubber with its covering of strands is contemporaneously subjected to heated paraffin which softens the rubber so that it enters the interstices between the strands and causes the strands to adhere to the rubber coating. The rubber is then vulcanized in the presence of steam.

Other objects and features of the invention will become apparent as the detailed description progresses, reference being had to the accompanying drawing, wherein Fig. 1 is a somewhat diagrammatic view of apparatus for practicing the improved method;

Fig. 2 is a section taken on line 2—2 of Fig. 1, and

Fig. 3 is a longitudinal elevation of a core having a sheath which has been formed by practicing the improved method.

Referring to the drawings a rotatably mounted reel 10 carries an electrical conductor 11 in strand form, which is hereafter referred to as the core 11 and which may be drawn through a die 12 of an extrusion machine 13 adapted to apply a coating 15 to the core, the coating 15 being of suitable plastic material, such as vulcanizable rubber compound. The coated core then passes through a rotatable serving head 16 driven by a belt 17, which serving head applies textile strands 18 to the coating 15. After leaving the serving head 16 the coated core passes through an impregnating device 20 which subjects the strands to paraffin, maintained in a liquid state by the application of heat. The coated core is then drawn through a housing 22 in which the coating 15 is vulcanized. After passing from the housing 22, the coated core is wound upon a take-up reel 23 driven by a belt 24 and rotatably supported by floor brackets 25.

The extrusion machine 13 may be of any well-known type, such as is commonly employed in covering electrical conductors with vulcanizable rubber, and it comprises a hopper 26 through which the material may be fed into a suitable feeding mechanism driven by a belt 27, the feeding mechanism supplying the material to the die 12, which forms the material into a uniform coating around the core. The rubber is preferably extruded at a temperature slightly below its vulcanizing temperature so that it may be vulcanized in a minimum amount of time during a contemporaneous step of the improved method.

The serving head 16 preferably comprises a plurality of cops 30 from which composite strands 31 are withdrawn and served to the coating 15, each composite strand 31 consisting of a plurality of the strands 18. Suitable guides 33 spread the strands 18 as they are applied to the coating 15 so that each strand 18 throughout its length contacts with the coating 15 and is equi-distantly spaced from the center of the core 11. The strands 18 are applied to the coating 15 in helical formation, each strand 18 being substantially in contact with the adjacent strands 18. The relatively large number of strands applied to the coating simultaneously make it possible to serve the strands in helices having a long pitch so that the coating 15 will be entirely covered by the strands when the extrusion machine 13 is operating at a relatively high speed.

The impregnating device 20 comprises a tank 35 for holding a supply of paraffin 36 which is heated by any suitable means (not shown). Partially immersed in the paraffin 36 is a rotatably mounted disc 37 driven by a belt 38. A trough 40 rigidly secured to the tank 35 receives the liquid paraffin from the disc 37 as the disc rotates. The coated core passes through the paraffin in the trough 40 and the strands 18 become impregnated therewith. The heated paraffin softens or fluxes the coating 15 to such an extent that the plastic material enters the interstices between the strands, causing the strands to adhere to the coating. The paraffin readily passes through the strands 18 because of their fibrous nature. Other substances may be employed in place of paraffin. Thus the salts formed by the heavy metals and fatty acids, as for instance, lead oleate, are well adapted to be so used, as is ceresin and other hydrocarbon compounds.

Associated with each end of the housing 22 is a mercury seal 42 through which the coated core passes when it enters and leaves the housing. Each mercury seal 42 comprises a U-shaped tube 43 in which sheaves 44 are mounted to guide the coated core through a quantity of mercury held in the U-shaped tube. The mercury seals 42 permit the pressure within the housing 22 to be maintained at any desired value, the housing being connected to a suitable supply (not shown) of steam by pipes 45 and 46. The steam is maintained at a temperature which is sufficiently high to effect vulcanization of the coating. The coating 15 and the strands 18 then become firmly self-attached to each other.

What is claimed is:

1. A process of sheathing a core, which consists in applying vulcanizable rubber compound around the core, applying a plurality of strands to said vulcanizable rubber compound, treating said rubber compound with a softening agent, and subsequently vulcanizing the rubber compound in such manner that the strands are attached thereto.

2. A process of sheathing a core, which comprises extruding vulcanizable material around the core, applying a plurality of strands to said material, impregnating said strands with matter adapted to soften said material, and subsequently vulcanizing said material in such manner that the strands are attached thereto.

3. A process of sheathing a core, which comprises extruding vulcanizable material around the core, applying a plurality of strands to said material, subjecting said material to a hydrocarbon compound, and subsequently vulcanizing said material.

4. A process of sheathing a core, which comprises extruding vulcanizable material around the core, applying a plurality of strands to said material, treating the said material with paraffin, and subsequently vulcanizing said material.

5. The process of sheathing a core, which comprises applying a vulcanizable rubber compound to the core, applying a serving of strands to the vulcanizable compound, subjecting the coated core to a softening agent for the rubber compound, and subsequently vulcanizing the rubber compound.

6. The process of sheathing a core, which comprises coating the core with a vulcanizable rubber compound, applying a serving of strands to the rubber compound, subjecting the sheathed core to melted paraffin, and finally vulcanizing the rubber compound.

7. A composite article, comprising a metallic core, a sheathing of vulcanized rubber compound around the core, and a serving of fibrous material around the rubber and embedded in the outside portion thereof, the fibrous material being impregnated with a mixture of paraffin and rubber.

In witness whereof, I hereunto subscribe my name this 6th day of October, A. D., 1924.

ROBERT R. WILLIAMS.